United States Patent [19]

Duke et al.

[11] Patent Number: 4,965,672

[45] Date of Patent: Oct. 23, 1990

[54] METHOD AND APPARATUS FOR HALFTONE IMAGING

[75] Inventors: Ronald J. Duke, Miamisburg, Ohio; Sun Lu, San Jose, Calif.; James R. McLaughlin, Kettering; Eric Walowit, Miamisburg, both of Ohio

[73] Assignee: The Mead Corporation, Dayton, Ohio

[21] Appl. No.: 48,156

[22] Filed: May 11, 1987

[51] Int. Cl.$^5$ ........................ H04N 1/036; H04N 1/23; H04N 1/46; G01D 15/14

[52] U.S. Cl. ................................ 358/298; 346/107 R; 358/300

[58] Field of Search ................. 358/298, 75, 296, 302; 346/108, 107 R, 160

[56] References Cited

U.S. PATENT DOCUMENTS

| | | | |
|---|---|---|---|
| 3,723,651 | 3/1973 | Gonog . | |
| 3,725,574 | 4/1973 | Gast | 358/298 |
| 3,775,757 | 11/1973 | Taylor et al. . | |
| 3,983,319 | 9/1976 | Moe | 358/298 |
| 4,040,047 | 8/1977 | Hareng et al. . | |
| 4,115,816 | 9/1978 | Moe | 358/298 |
| 4,198,154 | 4/1980 | Masegi et al. . | |
| 4,347,523 | 8/1982 | Ohara | 358/298 |
| 4,349,846 | 9/1982 | Sekigawa | 358/283 |
| 4,390,882 | 6/1983 | Ohara | 358/298 |
| 4,395,766 | 7/1983 | Ohnishi | 358/298 |
| 4,447,831 | 5/1984 | Adsett | 358/280 |
| 4,449,153 | 5/1984 | Tschang | 358/296 |
| 4,547,812 | 10/1985 | Waller | 358/298 |
| 4,564,853 | 1/1986 | Egan . | |
| 4,605,972 | 8/1986 | Hatanaka | 358/296 |
| 4,626,923 | 12/1986 | Yoshida . | |
| 4,639,127 | 1/1987 | Beery | 358/75 |
| 4,651,287 | 3/1987 | Tsao . | |
| 4,700,201 | 10/1987 | Sato | 358/298 |
| 4,709,395 | 11/1987 | Fischer | 358/283 |

FOREIGN PATENT DOCUMENTS

| | | | |
|---|---|---|---|
| 60-180370 | 9/1985 | Japan | 358/75 |
| 60-182864 | 9/1985 | Japan | 358/75 |

OTHER PUBLICATIONS

Full-Color Laser-Addressed Smetic Liquid-Crystal Projection Display, Yoshiharu Nagae et al., SID 86 Digest, pp. 368–371, 1986.

Laser-Addressed Liquid Crystal Projection Displays, Dewey et al., Proceeding of the S.I.D., vol. 19/1 First Quarter 1978, pp. 1–7.

*Primary Examiner*—Bruce A. Reynolds
*Assistant Examiner*—Scott A. Rogers
*Attorney, Agent, or Firm*—Thomas A. Boshinski

[57] ABSTRACT

A method and apparatus are disclosed for producing an image made up of marks having varying sizes, densities and/or shapes on an imaging media. The image is generated in response to image data defining the image to be produced received by an input scanner or other input device. The image data is processed and then used to address at least one amplitude and/or pulse width modulation table to, in turn, generate amplitude and pulse width signals which controls a writing device. Marks are therefore written onto the media, such marks having varying sizes, densities and/or shapes for forming the completed image.

28 Claims, 4 Drawing Sheets

126
128
130
132
134
136
124
130
114 C
120
121
114
122
114 A
112
114 B
118
116
110
112
IMAGE DATA SOURCE
102
POSITIONING SYSTEM
106 A
INTERFACE & CONTROL
153
DIGITAL IMAGE PROCESSING SYSTEM
150
108
ENERGY SOURCE
OUTPUT SCANNER CONTROLLER
106
DISCS
158
156
PWAM
PWAM
104
MODULATION CONTROLLER
154
DATA BUFFER & SYNC. SUBSYSTEM
152
IMAGE SYSTEM CONTROLLER

FIG - 4

THRESHOLDING

8 BIT ⇒ 1 BIT

| | |
|---|---|
| 50 | 175 |
| 100 | 30 |

⇩

| | |
|---|---|
| 0 | 255 |
| 0 | 0 |

FIG - 5

THRESHOLDING

8 BIT ⇒ 4 BIT

| | |
|---|---|
| 50 | 175 |
| 100 | 30 |

⇩

| | |
|---|---|
| 48 | 160 |
| 96 | 16 |

FIG - 6

ERROR DIFFUSION

8 BIT = 1 BIT

| | |
|---|---|
| 50 | 175 |
| 100 | 30 |

⇩

| | |
|---|---|
| 0 | 175 + 50 |
| 0 | 30 + 100 |

⇩

| | |
|---|---|
| 0 | 255 |
| 0 | 255 |

FIG-9
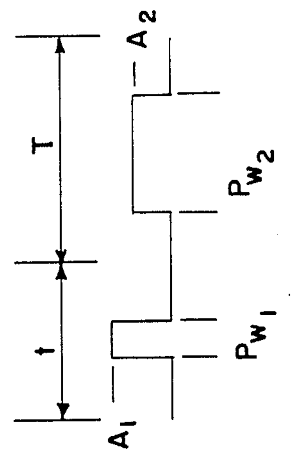
FIG-10
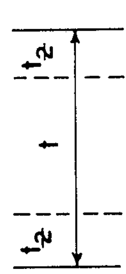
FIG-8
Floyd Steinberg
ERROR DIFFUSION
| | | |
|---|---|---|
| | ACTIVE PIXEL | + A*E |
| +B*E | +C*E | + D*E |
E = QUANTIZATION ERROR
A = 7/16
B = 1/16
C = 5/16
D = 3/16
FIG-7
ERROR DIFFUSION
8 BIT ⇒ 4 BIT
| | |
|---|---|
| 50 | 175 |
| 100 | 30 |
⇩
| | |
|---|---|
| 48 | 175 + 2 |
| 96 | 30 + 4 |
⇩
| | |
|---|---|
| 48 | 176 |
| 96 | 32 |

METHOD AND APPARATUS FOR HALFTONE IMAGING

BACKGROUND OF THE INVENTION

The present invention relates generally to the production of images on an imaging media, and more particularly, to a method and apparatus for forming an image made up of dots or, more accurately, marks having varying sizes, densities and/or shapes by generating amplitude and/or pulse width signals in response to image data defining the image to be produced. The imaging method and apparatus of the present invention are particularly applicable for imaging photosensitive materials of the type described in U.S. Pat. Nos. 4,399,209 and 4,440,846 to The Mead Corporation, and accordingly, will be described with emphasis toward application to such materials.

U.S. Pat. Nos. 4,399,209 and 4,440,846 describe an imaging system wherein a photosensitive layer comprising microcapsules containing a photosensitive composition in the internal phase is image-wise exposed to actinic radiation and subjected to a uniform rupturing force or process whereupon the microcapsules image-wise rupture and release the internal phase. The imaging system is particularly advantageous because it is a dry system and does not rely upon the application of wet development processing solutions to develop the image. An image forming chromogenic material, such as a substantially colorless colorformer, is typically associated with the microcapsules. When the microcapsules rupture, the released colorformer reacts with a developer material and produces a color image.

In an effort to fully utilize imaging materials in accordance with the referenced Mead patents, a variety of imaging applications and systems have been explored. One very promising application is the use of the Mead imaging materials to generate hard copies from image data generated by scanning an original to be reproduced, a computer graphics system or some other source for such image data. A problem that is encountered when attempting to make hard copy representations of an image is accurate representation of the gray scales of portions of the image represented by continuous tone. Gray scale representation has been done in the prior art by means of various halftone processing arrangements wherein such portions of an image are represented by varying sized marks. Halftone arrangements are well known in the printing and imaging arts.

One known halftoning technique is to form varying sized super marks by means of overlapping submarks, for example, as disclosed in U.S. Pat. No. 3,725,574. Another technique is to provide a liquid crystal which is imaged by means of a constant intensity radiation beam, with the liquid crystal being biased by video signals representative of the image to be formed as disclosed in U.S. Pat. Nos. 4,040,047 and 4,277,145. In yet another halftone imaging technique wherein a light beam is used for writing the image, the spot size of the writing beam is varied in accordance with the density information of the image to be recorded. This technique is disclosed in U.S. Pat. No. 4,198,154. Finally, still another technique for gray scale imaging in a system including a light valve array, portions of which are selectively activated to block or transmit light during line address periods, involves modulating the intensity of the light which passes to the light valve array as disclosed in U.S. Pat. No. 4,449,153.

Unfortunately, each of the known prior art imaging techniques has resolution problems, is overly complex or has other drawbacks, and hence, a new imaging system particularly compatible with the Mead imaging media, which permits gray scaling of the smallest addressable element of an image to be reproduced, is desired. While the Mead imaging media can be utilized in systems incorporating prior art imaging arrangements, the improved imaging system of the present invention optimizes the capabilities of the Mead imaging media and also may be advantageously applied to other imaging media.

SUMMARY OF THE INVENTION

In accordance with the present invention, a method and apparatus are provided for halftone imaging a variety of imaging media which method and apparatus are particularly applicable to the Mead imaging media. The improved imaging method and apparatus generate marks having varying sizes, densities and/or shapes on an imaging media to represent an image defined by imaging data provided by a scanner, a computer graphics system or other data source by means of processing the image data into amplitude and/or pulse width signals which are provided to writing means for controlling an energy source to write the marks on the imaging media. In its broadest form, the present invention relates to processing image data to address locations in an amplitude and/or pulse width table to generate appropriate amplitude and/or pulse width signals for the image defined by the image data.

The present invention seeks to increase the potential for accurately recreating or enhancing an image formed from image data. This is done by increasing the imaging system output information content which is proportional to the product of a number of parameters, including the number of marks per unit area, the number of mark sizes for a single image element or cell, the number of mark densities per cell, the number of mark shapes per cell, and the number of mark positions within the cell. The imaging system of the present invention exploits the maximum addressability of an output device for high spatial resolution since the system modulates marks at the single image element or cell size.

In accordance with one aspect of the present invention, imaging apparatus for producing an image made up of marks having varying sizes, densities and/or shapes on an imaging media comprises data source means for providing image data defining an image to be produced on the imaging media. Data processing means receive the image data and convert it into amplitude and/or pulse width signals which in turn drive writing means responsive to the amplitude and/or pulse width signals for controlling an energy source to write marks having varying sizes, densities and/or shapes defining the image.

The writing means may comprise a beam, and preferably a laser beam, which is scanned over the imaging media for direct writing of an imaging media. Alternatively, for indirect writing, the writing beam may be scanned over a beam sensitive light valve, with the image formed thereon being transferred from the light valve to the imaging media by exposure means. In either event, the writing beam ultimately produces marks of varying sizes, densities and/or shapes on the imaging media. Preferably, the light valve is a liquid crystal light modulator.

It is preferred to include scan rate monitoring means in the imaging apparatus for determining the actual scan rate of the writing beam for each of the marks as it is written. The data processing means can then, in response to the actual scan rate of one or more of the previously written marks, control the writing means to position one or more succeeding marks to help overcome artifacts and patterning which can occur in the image formed on the imaging media, and to introduce additional high frequency image information. While selectively varying the position of the marks may be advantageous for the reduction or elimination of artifacts and patterning in some images, it may be desired in other images or portions of other images to center the marks within scan periods based on the scan period of one or more previously written marks.

The data processing means preferably comprises a plurality of amplitude and/or pulse width modulation tables which are addressed in accordance with the image data defining an image to be generated on the imaging media. The particular one of the plurality of modulation tables can be selected in response to actual characteristics of one or more apparatus parameters which are monitored for such table selection. For example, the tables may be selected based on the actual or nominal scan rate of a writing beam, a selected one of a plurality of selectable light valves, color data for a light valve, the intensity of exposing apparatus which is used in conjunction with a light valve, color characteristics of the imaging media or the like.

In accordance with another aspect of the present invention, apparatus for processing image data in an imaging system to produce signals defining marks of varying sizes, densities and/or shapes which, when recorded, reproduce an image represented by the image data comprises a plurality of amplitude and/or pulse width modulation tables and table addressing means for manipulating the image data to define addresses within the modulation tables. In accordance with this aspect of the present invention, image data is mapped into selected amplitude and/or pulse width signals defining mark sizes, densities and/or shapes required to reproduce the image defined by the image data.

Preferably, the imaging system further comprises thermal writing means responsive to the amplitude and/or pulse width signals, a thermosensitive surface, and output scanner means for scanning the thermal writing means over the thermosensitive surface to generate marks thereon corresponding to the image. The marks may be positioned within defined scan periods in accordance with a nominal scan rate, or by monitoring the actual scan rate of the scanner means. In some applications, the positioning may be a centering of the marks for all or a portion of the marks. The scan rate may also be used to select among the plurality of modulation tables. Alternately, or in addition, the modulation tables may be selected based on color data for one of a selectable number of liquid crystal light modulators, the characteristics of imaging media being processed which may be provided in machine-readable form for the apparatus, or for other measured characteristics of a variety of apparatus parameters.

In accordance with yet another aspect of the present invention, a method for generating marks having varying sizes, densities and/or shapes on an imaging media to produce an image thereon comprises the steps of: generating image data defining an image to be reproduced on the imaging media; processing the image data to generate amplitude and/or pulse width signals corresponding thereto; controlling thermal writing means in response to the amplitude and/or pulse width signals; and, scanning the thermal writing means over a thermosensitive surface to write varying size, density and/or shape marks required to produce the image on the thermosensitive surface. The thermosensitive surface may comprise a liquid crystal light modulator, and the method further comprise exposing an imaging media via the liquid crystal light modulator to form a reproduction of the image on the imaging media. The amplitude and/or pulse width signals may be generated by establishing a modulation table including a plurality of amplitude and/or pulse width values, each of the values being associated with a unique address within the table wherein the processing of the image data includes mapping the image data to the addresses to select appropriate amplitude and/or pulse width values.

It is, therefore, a primary object of the present invention to provide an improved method and apparatus for producing an image made up of marks having varying sizes, densities and/or shapes on an imaging media in response to image data defining the image to be produced by means of processing the image data to address an amplitude and/or pulse width modulation table to, in turn, generate amplitude and/or pulse width signals which control writing means to write marks having varying sizes, densities and/or shapes on the imaging media.

Other objects and advantages of the invention will be apparent from the following description, the accompanying drawings, and the appended claims.

BRIEF DESCRIPTION OF THE DRAWINGS

FIG. 4 illustrates the application of binary quantization for image processing.

FIG. 5 illustrates the application of multilevel quantization for image processing.

FIG. 6 illustrates the application of binary error reduction for image processing.

FIG. 7 illustrates the application of multilevel error reduction for image processing.

FIG. 8 illustrates an error-diffusion kernel.

FIG. 9 illustrates variable amplitude and pulse width based on the scan rate of the output scanner.

FIG. 10 illustrates image mark positioning based on the scan rate of the output scanner.

DETAILED DESCRIPTION OF THE INVENTION

Figure 1:
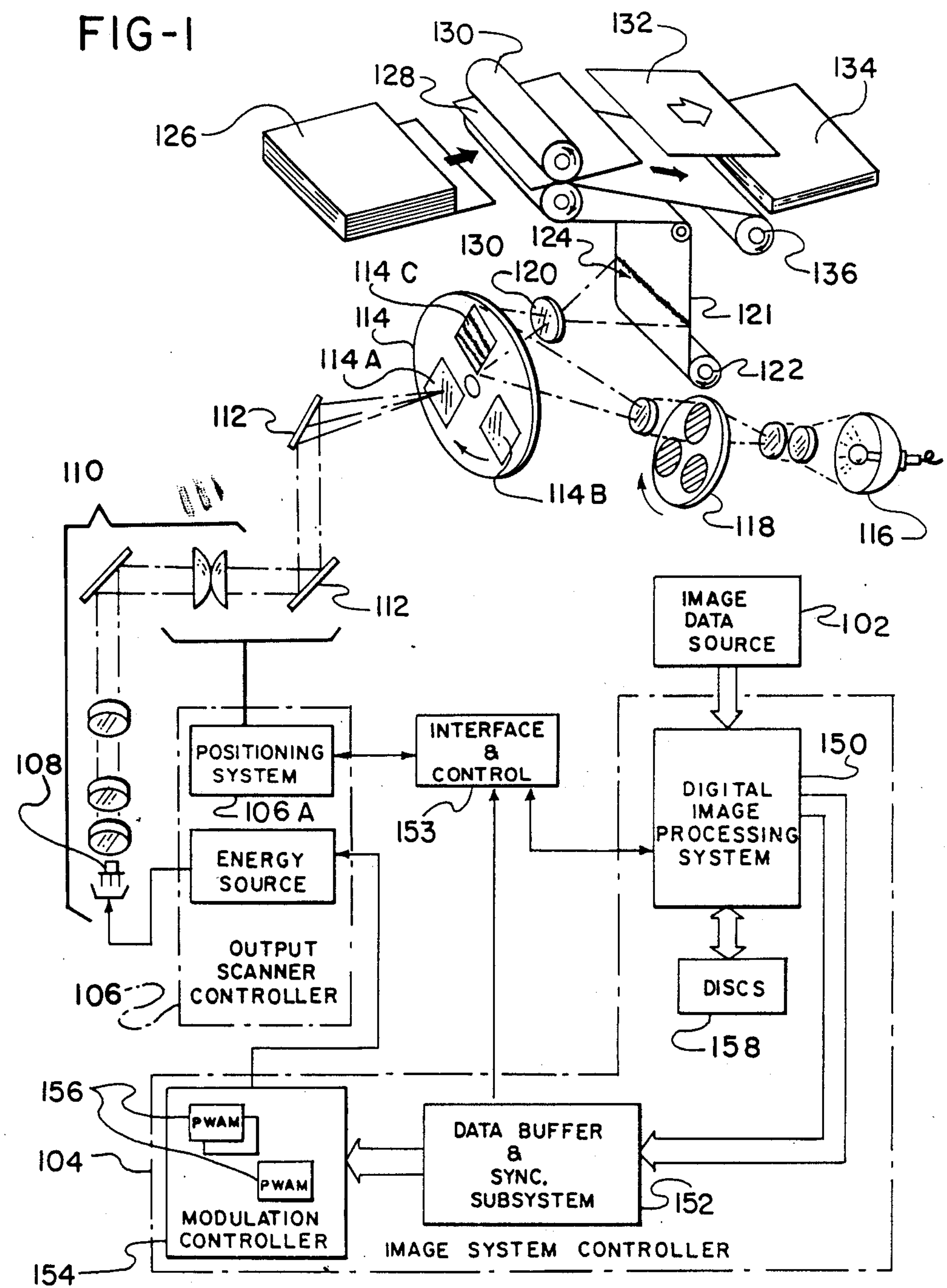
FIG. 1 is a schematic block diagram of an imaging system in accordance with the present invention.

While the method and apparatus of the present invention can be used to image a variety of imaging media, they are particularly applicable for imaging the Mead imaging media described above, and accordingly, will be described with reference to such media. In FIG. 1, an imaging system 100 in accordance with the present invention produces images representative of image data on Mead imaging media. In the illustrated embodiment, the images are transferred to final copy sheets which include developer material utilized in accordance with one embodiment of the Mead imaging media.

The imaging system 100 shown in FIG. 1 includes data source means 102 for providing image data defining an image to be produced on an imaging media. The data source means 102 can be a scanner for reproducing originals, or any other data source, such as a computer graphics system. The image data is transferred to an image system controller 104 which includes data processing means for receiving the image data and converting the image data into amplitude and/or pulse width signals which are passed to writing means. In the illustrated embodiment, the writing means includes an output scanner controller 106 which in turn controls a laser diode 108, a dynamic focusing system 110, and a galvanometer mirror system 112 which serves to scan the focused laser beam in both the X and Y directions onto a light valve 114 to produce marks of varying sizes, densities and/or shapes on the light valve.

The light valve 114 is illustrated as comprising a rotating turret containing three light valves of the thermal smectic type which preferably comprise liquid crystal light modulators 114A, 114B and 114C, with the light modulator 114A being shown in the scan position to produce an image thereon in FIG. 1. The use of three light modulators 114A–114C permits a full three-color image to be produced provided, of course, that the input image data provides full three-color image information, typically, red, green and blue (RGB) primary colorants. The RGB input information is processed and converted to corresponding appropriate output color information, such as cyan, magenta and yellow (CMY) colorants. If the resulting cyan image information is transferred, for example, to the light modulator 114A, then the resulting magenta image information is transferred to the light modulator 114B, and the resulting yellow image information is transferred to the light modulator 114C. In the illustrated embodiment, three liquid cyrstal light modulators 114A–114C are utilized; however, additional light modulators can be used for separate black image data or other primary colorants or, indeed, a single light modulator could be used for black and white and full color imaging.

Figure 2:
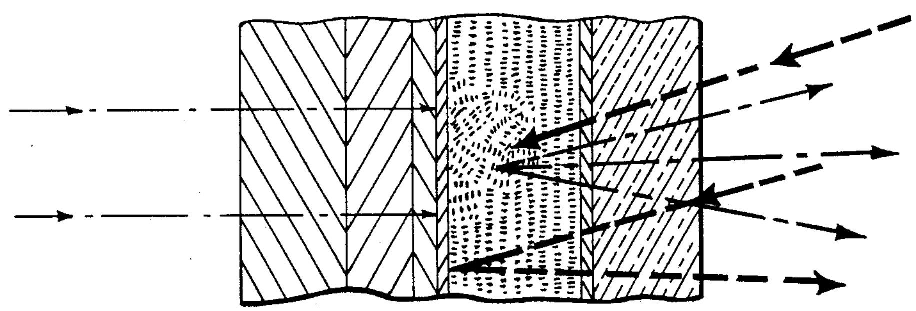
FIG. 2 illustrates the construction of a liquid crystal light modulator suitable for use in the present invention.

In the illustrated embodiment, the light modulators 114A–114C are of a type to be written from one side and read from the other or printing side of the light modulators by means of reflecting appropriate actinic radiation from the light modulators 114A–114C and focusing it upon the media to be imaged. An example of a preferred liquid crystal light modulator is shown in FIG. 2. The modulator includes cell **114*a* which contains a liquid crystal layer 114*b***. Any suitable liquid crystal material of the smectic-A class may be used. Heat is applied to the liquid crystal material to transform the material into the isotropic state to form light-scattering regions. Afterwards, the liquid crystal is cooled back to the smectic state. The writtenscattering regions are then stable within the smectic temperature range of the specific liquid crystal material, and the written information will be preserved.

Cell **114*a* is supported by a pair of transparent substrate layers 114*c* and 114*d*, which layers are preferably formed from glass. Located between substrate layer 114*d* and liquid crystal material 114*b* is a layer of a transparent electrically conductive material 114*e*. This transparent layer is preferably formed from indium-tin oxide. A second electrically conductive layer 114*f* formed from a reflective material, such as aluminum, for reasons to be described below, is located adjacent the liquid crystal layer 114*b* opposite layer 114*e*. Layers 114*e* and 114*f* together act as conductors for use in erasing the liquid crystal cell 114*a*. An electric field can be generated between layers 114*e* and 114*f*** to realign the liquid crystal into a totaling non-scattering, transparent state.

Located between substrate layer **114*c* and layer 114*f* is an anti-reflection layer 114*g*, preferably formed from a dielectric material, and an infrared absorber layer 114*h*, preferably formed from aluminum and/or chromium. In writing information onto the cell 114*a*, an infrared laser diode or other source produces a laser beam which is directed onto the cell 114*a* in the manner generally indicated by beam 114*i* in FIG. 2. The beam 114*i* passes through transparent substrate layer 114*c* and into absorber layer 114*h*. As the laser radiation is absorbed heat is generated in the absorber layer 114*h*. This heat then acts upon the liquid crystal material within layer 114*b* through reflector layer 114*f*** to create the scattering regions corresponding to the image information to be recorded.

A scattering region is shown in FIG. 2 within cell **114*a* generally at 114*j***. Here, the molecules of the liquid crystal have been arrayed in random fashion, as contrasted with the uniform, aligned manner of the molecules in the non-scattering regions. It is the high scattering profile of the written area which, when contrasted with the low scattering profile of the unwritten area, causes the appearance of a mark.

Because the mechanism for writing on the liquid crystal material is thermal, it is possible to effectively "grow" marks in the liquid crystal material. If laser beam **114*i* is permitted to heat absorber layer 114*h*, heat will initially be applied within the portion of absorber layer 114*h* falling within the beam cross-section. However, if heat is applied for a relatively long period, it will extend by thermal conductivity beyond the beam cross-section, thereby creating a mark of greater diameter than the beam 114*i*. Moreover, the intensity of the radiation within the beam is not uniform, but rather is Gaussian, with a central region having greater intensity than the outer regions. Thus, it is also possible to write a mark having a diameter smaller than the beam 114*i*** by terminating exposure to the beam after a relatively short time. It has been found that, with the apparatus of the preferred embodiment, it is possible, with a laser beam having a diameter of 20 microns, to write marks having diameters within the range of approximately 7 to 100 microns.

In the present invention, it is possible to write a variety of marks having not only differing sizes, but also differing densities and shapes by controlling and coordinating the pulse width and amplitude for each mark. For example, if the pulse width is short, and the amplitude is high, a small, dense mark is formed; if the pulse width is long, and the amplitude is low, a large, less dense mark is formed. Although the mark can be smaller than the writing beam, the shape, energy distribution and orientation of the beam effects the shape of the mark. By selecting various combinations of writing parameters, the mark size, shape and/or density are controlled.

After cell **114*a* has been written, the image can be projected onto a photosensitive media by directing projection light onto the cell through glass substrate 114*d*. The projection light may, as illustrated by ray 114*k*, strike a non-scattering region of the liquid crystal layer 114*b*. This light passes through the liquid crystal material and is reflected by reflector layer 114*f*. The projection light then is returned through the liquid crystal material 114*b* and glass substrate layer 114*d*, and is directed onto the photosensitive media for exposure of the media. As illustrated by ray 114*m*, projection light which is directed onto scattering region 114*j*** is scattered by the randomly oriented molecules. Very little of the incident light thus reaches the photosensitive media, and the media is left effectively unexposed.

In the illustrated embodiment wherein full three-color imaging is performed, a source 116 of actinic radiation is directed upon the printing side of the light modulator which is rotated into the appropriate position, the position of the light modulator 114C as shown in FIG. 1. The actinic radiation is passed through one of the filters in a filter wheel 118 such that the corresponding frequencies of radiation for cyan, magenta and yellow are reflected from the light modulator positioned in the location of 114C and focused onto imaging media by means of a lens system 120. The light modulators 114A–114C and the filter wheel 118 are rotated in synchronism to provide desired filtering for a given light modulator.

In the illustrative embodiment, the Mead imaging media 121, which is of a transfer variety as described in the above-referenced Mead patents, is provided in a continuous roll 122 of the media. The media 121 is scrolled such that it passes through an exposure station 124 for being imaged by the actinic radiation from the source 116 reflected from the light modulator in the position of light modulator 114C. The imaging media 121 which has now been imaged at the exposure station 124 is moved to synchronize with a source of transfer sheets 126. The imaged area of the imaging media 121 is aligned with a single transfer sheet 128 and passed through pressure rollers 130 or the like to develop the image and transfer it to the transfer sheet 128 resulting in a reproduction 132 of an image corresponding to the image data provided from the image data source 102. The reproduced images are then positioned in a stack 134 and the used imaging media 121 is accumulated on a take-up reel 136.

One example of the image data means 102 is a document scanner produced by Sharp, which samples at 300 elements per inch and provides 8 bits of information for each of the three primary colors (RGB) for each sample element of an image or document being scanned. Hence, the image data comprises up to 24 bits of information (8 bits for each of the three primary colors RGB) for each sample element of an image to be reproduced by the imaging system 100. As a result, the incoming data can represent 256 levels of intensity for each of the primary colors of each sample element of the scanned original.

The image system controller 104 consists of three subsystems: a digital image processing subsystem 150 performs halftone and color processing; a data buffer and synchronization subsystem 152 synchronizes the transfer of processed image data from the digital image processing subsystem 150; and, a modulation controller subsystem 154 converts the digital image data to the actual pulse width and/or amplitude signals that control the laser 108 for writing a liquid crystal light modulator 114.

The digital image processing subsystem 150 takes the original image data and requantizes it to allow spatial and color reproduction of the original when imaged by the system. This requantization requires several operations. Initially, the imaging data is thresholded. The thresholding is multilevel which is an extension of conventional binary thresholding. Binary thresholding provides a bilevel output, i.e., for 8 bits of input data, values between 0 and X are assigned, say, a "0" value and values between X+1 and 255 are assigned, say, a "1" value, where X is any value between 0 and 255.

In the multilevel thresholding arrangement, the data is sorted into $2^n$ different "bins" or values, where n is the number of bits to which the data is reduced, by dividing the possible number of input levels into $2^n$ different steps. Each bin therefore encompasses a range of possible input levels, and represents one possible output level. The bins may each include an equal number of input increments, or the increments may be unevenly distributed. The gray scale value of a given sample element is thus assigned a value equal to the output level to which it is closest. In one simple example, an 8 bit input includes 256 levels. For a 4 bit output, 16 steps of 17 increments each may be defined, with the output levels being defined by 0, 17, 34 and so forth up to 255. Accordingly, in this example, the 8 bits of information are processed to a 4 bit output, or 16 different levels, based on the multilevel thresholding arrangement.

Conventional binary error reduction techniques, such as Floyd Steinberg error diffusion and dithering techniques, are also expanded for multilevel application in the present invention.

For color processing, first it is necessary to establish an approximate color palette. This is accomplished by selecting a subset of a plurality of pulse width/amplitude modulation (PWAM) tables appropriate to the specific imaging conditions and then imaging one or more color test patterns. The resulting colors are fed back to the system and the palette determined. Second, the image is requantized by determining the color of a scanned sample element under consideration and selecting the closest color from the palette. Any remaining error after thresholding to the color palette is reduced using the multilevel error reduction techniques noted above.

In a preferred embodiment, the original image data is transformed to a uniform color space (UCS) whose characteristics have been well established in the industry. This yields absolute color coordinates for the sample elements of every image. Similarly, the absolute UCS coordinates of the color palette are measured. The UCS has the attribute that the chromatic and achromatic color component vectors can be operated on independently with approximate stationarity. A set of lookup tables is generated in the digital image processing subsystem 150 by taking a subset of every possible combination of input sample element UCS coordinates and selecting the palette color whose UCS coordinates are closest. Those possible palette colors that are not measured are derived. The error that results when a palette color does not have the exact same UCS coordinates as the input sample element is calculated and stored as additional entries in a lookup table for subsequent error reduction.

Input image colors can potentially lie outside the range of the output colorant palette. The applicants have implemented several methods to deal with these irreproducible colors, depending on the type of image. In one embodiment, an irreproducible color is brought to the edge of the colorant palette by determining the shortest vector distance from the said color to the edge of the colorant palette. In another embodiment, the achromatic component is preserved as nearly as possible and only the chromatic components are adjusted to bring the color to the edge of the colorant palette in such a way that hue and/or lightness constancy is nearly preserved.

In yet another embodiment, the colors are not clipped, rather all colors are compressed such that the range of input colors just fits within the range of output colors. This compression can also be done selectively and nonlinearly, such that for every quantized achromatic level and hue level, the chromatic component is compressed to fit within the output range possible for said chromatic and achromatic levels while preserving hue and/or lightness as nearly as possible. In general, the error that results when a palette color does not have the exact same UCS coordinates as an input sample element is calculated and stored as additional entries in a lookup table for subsequent use in error reduction. When the lookup table is applied to the image, every input color selects the closest output color and the error is then reduced in each color vector independently. In this preferred embodiment, multilevel halftoning, color correction and error reduction are performed simultaneously through lookup table generation and application.

The increased information content possible with the described imaging system allows more image information to be transferred to the hardcopy output. Given fixed spatial resolution, this increased information content is due to the increase in tonal resolution made possible by mark modulation at the smallest addressable element. One novelty of the invention is the increased tonal resolution over that of binary printers where no mark modulation occurs: in such printers a mark is either placed or not placed. In order to take advantage of the increased tonal resolution of the present invention, image processing means has been developed that uses known binary halftoning techniques, but extends such techniques to a multilevel system.

Figure 3:
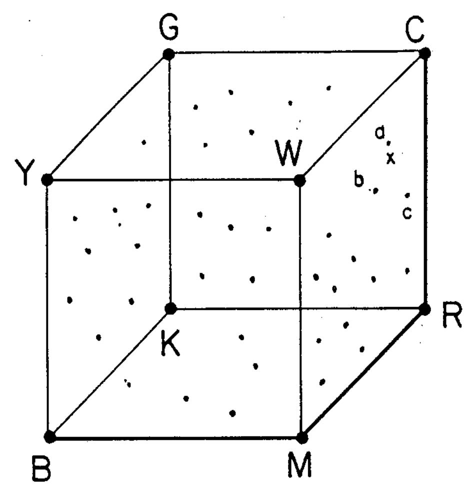
FIG. 3 illustrates a color cube showing the application of multilevel image processing as used with the present invention.

The extension of these algorithms can best be visualized with respect to FIG. 3, which shows a well-known RGB color cube. Colors which can be exactly reproduced by a binary printer are located at the corners of the cube. Located at these corners are individual primaries or their overprints, shown as large dots. In the multilevel system, however, colors intermediate between fully on and fully off primaries can be exactly reproduced, with examples shown as small dots. For instance, suppose an input color is defined by the X in FIG. 3. In the binary case, the cyan corner C would be selected, while in the multilevel case, one of the three closer dots a, b, or c would be selected. Since the error introduced is proportional to the distance between the input color and the quantized output color, smaller error results in the multilevel situation.

Thus, one novelty of the present invention is the capability for multilevel requantization of the input image data and error reduction in the process of multilevel halftoning. Once such requantization has been accomplished, error reduction is used to minimize the artifacts associated with the quantization. FIGS. 4 and 5 compare binary with, for example, a 4 bit multilevel quantization. FIGS. 6 and 7 compare binary with, for example, a 4 bit multilevel error reduction. (One pixel error diffusion is illustrated.) FIG. 8 illustrates a well known error-diffusion kernel. Other error reduction algorithms widely found in the literature are also applicable, such as dithering, pattern printing, electronic screening, and the like. Each of these techniques are well known to those skilled in the art for use in binary systems, and details of such techniques are therefore not further disclosed.

The processed image data is passed from the digital image processing subsystem 150 to a data buffer and synchronization subsystem 152 which serves to buffer and synchronize the image data with a laser beam positioning system 106A of the output scanner controller 106 via an interface and control circuit 153. The processed image data from the data buffer and synchronization subsystem 152 passes to the modulation controller subsystem 154 wherein amplitude and/or pulse width signals are selected to correspond to the processed image data. The transformation of the processed image data into amplitude and/or pulse width signals is performed by addressing at least one pulse width/amplitude modulation (PWAM) table 156, with a plurality of PWAM tables 156 being shown in the modulation controller subsystem 154. In the illustrated embodiment, all digital image processing is performed in the digital image processing subsystem 150; however, it should be apparent that the processing can be shared among the subsystems 150, 152, 154.

The PWAM table 156 or plurality of tables 156 contain desired amplitude and/or pulse width modulation information which is passed to the output scanner controller 106. This information read from the PWAM table 156 or tables 156 determines the pulse width and/or the amplitude of the laser beam generated by the laser 108 which is applied to the light modulator 114 as shown in FIG. 1. The information contained in the PWAM table 156 or tables 156 can be selected based on a variety of information including the characteristics of the media to be imaged, including its color characteristics, various parameters of the imaging system 100 including intensity of the exposure source and scan rate of the writing laser, the particular color which is to be imaged, and the characteristics of the light modulator 114 being used. One or more of these or other system/media parameters may be provided on a static basis or on a dynamic feedback basis to optimize the images which are produced.

The provision of a plurality of physical or hardware PWAM tables 156 permits ready selection among the tables based on one or more system parameters which are either statically or dynamically determined, and appears to be the most practical and rapid way of implementing the method and apparatus of the present application. However, it should be apparent that a single PWAM table 156 can be provided and updated on a periodic basis by the digital image processing subsystem 150 in the event such updating and processing can be performed at a sufficiently rapid rate to permit rapid imaging.

To-date, the amplitude and pulse width values provided within the PWAM table 156 or tables 156 have been determined on an empirical basis by producing images having corresponding PWAM table values and adjusting the values accordingly until the most desirable image possible has been created. It is the ultimate goal of the present invention to provide automatic determination of PWAM table values based on parameters relating to the imaging system 100, including the media being imaged, the color being imaged, the intensity of the exposure light, the scan rate of the output scanner, and various other parameters which may vary over time and application. The automatically determined PWAM table values may be calculated by the digital image processing subsystem 150 on a dynamic basis, or may be stored in discs 158 or other storage media which forms a part of the image system controller 104.

Applicants have determined that images produced by the imaging system 100 can be optimized by customizing the PWAM table values based on the scan rate. This can be done by having a plurality of PWAM tables and selecting one of the tables based on either the nominal or actual scan rate. Alternately, a single PWAM table could be updated based on the scan rate. Such use of the actual scan rate to optimize the values contained within the PWAM tables also allows foı the use of a scanner which does not need precise control, and hence, may be less expensive. The use of such economical components may be critical for certain applications of the imaging system 100. Similarly, either nominal or actual scan rate or period of scan for one or more preceding output scan elements can be used to position the mark within its scan period. This is based on the assumption that scan rate will not vary appreciably from one scan period to the next. Such control of the positioning of imaging marks within their scan periods can prevent the formation of artifacts and a variety of patterning which often occur in halftone imaging systems, and can be used to introduce additional high frequency image information Applicants have also determined that the scan rate of the output scanner which, in this case, controls the laser 108, the dynamic focusing system 110, and the galvanometer mirror system 112, can effect the size, density and shape of marks formed on an imaging media. This is due to the fact that for a given pulse width and power amplitude for the laser 108, the energy distribution within a scanned element will be varied if the scan is either slower or faster than the nominal value. Accordingly, scan rate monitoring means are provided. In the illustrated image system controller 104, the modulation controller 154 is connected to the output scanner controller 106 via the interface and control 153 and the data buffer and synchronization subsystem such that the scan rate of the writing means, or in this case, the laser 108 and associated equipment can be monitored to determine the actual scan rate.

The characteristics of the imaging system 100 showing the desirability of selecting various PWAM table values based on the scan rate are illustrated in FIG. 9. For example, if the scanner is running at a more rapid rate than nominal, as shown by t, an amplitude A1 and a pulse width $PW_1$ may be ideal to form a given size, density and shape of mark corresponding to a given sample element representative of the image data. On the other hand, the same imaging mark may be more accurately imaged when the scanner is running at a scan rate below the nominal value, as indicated by the scan period T, by selecting a wider pulse width $PW_2$ at a reduced amplitude $A_2$.

In FIG. 10, the positioning of an image mark within a sample period is defined for centering the mark where t is the scan period of one or more preceding marks, $t_{ON}$ is the pulse width or on-time for the laser for this scan period, and $t_Z$ is the time which must precede and succeed the on-time of the laser to center that pulse width within the scan period. As illustrated, $t_{ON}$ is subtracted from t and divided by 2 to arrive at $t_Z$. For other positioning of marks within scan periods, the on-time $t_{ON}$ can be subtracted from the scan period t, with the divisor being determined in accordance with the desired positioning of a mark within the scan period. For example, the time preceding the turn-on time of the laser can be determined by dividing $t-t_{ON}$ by a number greater than 2 to move the mark to the left of the pixel scan period, or by a number less than 2 to move the mark to the right of the sample scan period. By providing for mark placement within individual scan periods, the imaging system of the present invention provides the means for eliminating a variety of patterning associated with halftone imaging and also the ability to enhance images to be produced by introducing additional high frequency image information.

The imaging system of the present invention can be used to form images with either a raster scan or a vector scan. While it is more apparent that halftone images are amenable to raster scan techniques, use of the present invention for vector scanning can lead to a number of desirable imaging features including vectored lines of varying and/or controlled line widths, desities and/or shapes. Each of the features described herein is applicable to the formation of images using a vector scan. Moreover, that the same system is usable with either a raster or vector scan output represents a significant advantage of the system.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. Imaging apparatus for producing on an imaging media an image made up of marks varying in at least one of size, density and shape, said apparatus comprising:

data source means for providing image data defining an image to be produced on said imaging media;

data processing means for receiving said image data and for converting said image data into amplitude and pulse width signals;

writing means responsive to said amplitude and pulse width signals for controlling an energy source to write marks on said imaging media varying in at least one of size, density and shape;

said writing means including a writing beam and means for scanning said beam over said imaging media;

said writing means further including a beam sensitive light valve upon which said writing beam is scanned to produce marks thereon varying in one of size, density and shape, and exposure means for transferring said marks from said light valve to said imaging media.

2. Imaging apparatus as claimed in claim 1 wherein said writing beam is a laser beam and said light valve is a liquid crystal light modulator.

3. Imaging apparatus as claimed in claim 2 wherein said writing means comprises at least three selectable liquid crystal light modulators, and said data processing means comprises a plurality of modulation tables each comprising values for said amplitude and pulse width signals, one of said modulation tables being selected in response to color data for each of said liquid crystal light modulators.

4. Imaging apparatus for producing on an imaging media an image made up of marks varying in at least one of size, density and shape, said apparatus comprising:

data source means for providing image data defining an image to be produced on said imaging media;

data processing means for receiving said image data and for converting said image data into amplitude and pulse width signals;

writing means responsive to said amplitude and pulse width signals for controlling an energy source to write marks on said imaging media varying in at least one of size, density and shape;

said writing means including a writing beam and means for scanning said beam over said imaging media;

scan rate monitoring means for determining the actual scan rate of said writing beam for each of said marks as it is written, said data processing means being responsive to the actual scan rate of at least one of said marks for controlling said writing means to position at least one of said marks imaged thereafter.

5. Imaging apparatus as claimed in claim 4 wherein said marks are assigned nominal scan periods within which said marks are to be written, said scan rate monitoring means determining the actual scan periods within which said marks are written, and said data processing means being responsive to the actual scan rate for controlling said writing means to center succeeding marks within scan periods based on the actual scan period of at least one preceding mark.

6. Imaging apparatus for producing on an imaging media an image made up of marks varying in at least one of size, density and shape, said apparatus comprising:

data source means for providing image data defining an image to be produced on said imaging media;

data processing means for receiving said image data and for converting said image data into amplitude and pulse width signals;

writing means responsive to said amplitude and pulse width signals for controlling an energy source to write marks on said imaging media varying in at least one of size, density and shape;

said writing means including a writing beam and means for scanning said beam over said imaging media;

said data processing means including a plurality of modulation tables each comprising values for said amplitude and pulse width signals, said apparatus further comprising apparatus parameter monitoring means for determining the actual characteristics of an apparatus parameter and generating a parameter signal representative thereof, said data processing means being responsive to said parameter signal for selecting one of said modulation tables as a function of the actual characteristics of said apparatus parameter.

7. Imaging apparatus as claimed in claim 6 further comprising a plurality of selectable light valves, and wherein said apparatus parameter is the one of said light valves actually selected.

8. Imaging apparatus as claimed in claim 6 wherein said apparatus parameter monitoring means includes scan rate monitoring means for determining the actual scan rate of said writing beam and generating a scan rate signal representative thereof, said data processing means being responsive to said scan rate signal for selecting one of said modulation tables as a function of said scan rate.

9. Imaging apparatus as claimed in claim 6 wherein said apparatus parameter monitoring means includes scan rate monitoring means for determining the nominal scan rate of said writing beam and generating a scan rate signal representative thereof, said data processing means being responsive to said scan rate signal for selecting one of said modulation tables as a function of said scan rate.

10. Imaging apparatus as claimed in claim 6 wherein said apparatus parameter monitoring means includes means for determining the characteristics of said imaging media being imaged by said apparatus and generating a media signal representative thereof, said data processing means being responsive to said media signal for selecting one of said modulation tables as a function of said media characteristics.

11. Imaging apparatus as claimed in claim 10 wherein the characteristics of said imaging media are provided in machine-readable and said apparatus further comprises reader means for reading said characteristics.

12. Apparatus for processing image data in an imaging system to produce signals defining marks varying in one of size, density and shape which, when recorded, reproduce an image represented by the image data, said apparatus comprising:

at least one modulation table each comprising values for amplitude and pulse width;

table addressing means for manipulating said image data to define addresses within said modulation tables whereby said image data is mapped into selected ones of said values to define amplitude and pulse width signals defining at least one of mark sizes, densities and shapes required to reproduce said image; and means for performing multiple level requantization and error reduction on said image data whereby each element of said image data is assigned to one of a multiple number of input levels prior to mapping of said image data into said amplitude and pulse width signals.

13. Imaging apparatus for generating an image reproduction made up of marks varying in at least one of size, density and shape on an imaging media, said apparatus comprising:

data source means for providing image data defining an image to be reproduced on said imaging media;

data processing means for generating amplitude and pulse width signals in response to said image data;

thermal writing means responsive to said amplitude and pulse width signals;

a thermosensitive surface; and output scanner means for scanning said thermal writing means over said thermosensitive surface to generate marks having sizes, densities and shapes to reproduce said image;

said data processing means including a plurality of modulation tables each comprising values for said amplitude and pulse width signals, said apparatus further comprising apparatus parameter monitoring means for determining the actual characteristics of an apparatus parameter and generating a parameter signal representative thereof, said data processing means being responsive to said parameter signal for selecting one of said modulation tables as a function of the actual characteristics of said apparatus parameter.

14. Apparatus as claimed in claim 13 wherein said marks are assigned nominal scan periods within which said marks are to be written, and said apparatus further comprises mark positioning means for selectively positioning said marks within said scan periods.

15. Apparatus as claimed in claim 14 wherein said mark positioning means centers said marks within said nominal scan periods.

16. Imaging apparatus as claimed in claim 13 wherein said apparatus parameter monitoring means includes scan rate monitoring means for determining the actual scan rate of said writing beam and generating a scan rate signal representative thereof, said data processing means being responsive to said scan rate signal for selecting one of said modulation tables as a function of said scan rate.

17. Apparatus as claimed in claim 16 wherein said apparatus further comprises mark positioning means for selectively positioning said marks within said scan periods.

18. Apparatus as claimed in claim 17 wherein said mark positioning means centers said marks within said scan periods.

19. Imaging apparatus as claimed in claim 13 wherein said apparatus parameter monitoring means includes scan rate monitoring means for determining the nominal scan rate of said writing beam and generating a scan rate signal representative thereof, said data processing means being responsive to said scan rate signal for selecting one of said modulation tables as a function of said scan rate.

20. Imaging apparatus as claimed in claim 13 further comprising a plurality of selectable light valves, and wherein said apparatus parameter is the one of said light valves actually selected.

21. Imaging apparatus as claimed in claim 13 wherein said apparatus parameter monitoring means includes means for determining the characteristics of said imaging media being imaged by said apparatus and generating a media signal representative thereof, said data processing means being responsive to said media signal for selecting one of said modulation tables as a function of said media characteristics.

22. Imaging apparatus as claimed in claim 21 wherein the characteristics of said imaging media are provided in machine-readable form and said apparatus further comprises reader means for reading said characteristics.

23. Imaging apparatus as claimed in claim 13 wherein said data source comprises input scanner means for generating image data representative of an original to be reproduced.

24. Imaging apparatus as claimed in claim 13 wherein said thermal writing means comprises a laser beam.

25. Imaging apparatus as claimed in claim 13 wherein said thermosensitive surface comprises a liquid cyrstal light modulator, and said imaging apparatus further comprises exposure means for imaging an imaging media via said liquid crystal light modulator.

26. A method for generating marks varying in at least one of size, density and shape on an imaging media to reproduce an image thereon, said method comprising the steps of:

generating image data defining an image to be reproduced on said imaging media;

processing said image data to generate amplitude and pulse width signals corresponding thereto;

controlling thermal writing means in response to said amplitude and pulse width signals; and scanning said thermal writing means over a thermosensitive surface to write marks which vary in at least one of size, density and shape as required to produce said image on said thermosensitive surface;

monitoring and determining the actual characteristics of an apparatus parameter and generating a parameter signal representative thereof;

selecting one of a plurality of modulation tables each comprising values for said amplitude and pulse width signals, said selecting of one of said modulation tables being a function of the actual characteristics of said apparatus parameter.

27. A method as claimed in claim 26 wherein said thermosensitive surface comprises a liquid crystal light modulator, and said method further comprises exposing an imaging media via said liquid crystal light modulator to form a reproduction of said image on said imaging media.

28. A method as claimed in claim 27 wherein said amplitude and/or pulse width signals are generated by establishing a modulation table including a plurality of amplitude and/or pulse width values, each of said values being associated with a unique address within said table, and wherein said processing of said image data includes mapping said image data to said addresses to select amplitude and/or pulse width values.

* * * * *